(12) United States Patent
Reyes

(10) Patent No.: US 10,885,014 B2
(45) Date of Patent: Jan. 5, 2021

(54) ASSIGNING MONITORING RESPONSIBILITIES IN DISTRIBUTED SYSTEMS USING OPTIMISTIC CONCURRENCY

(71) Applicant: Citrix Systems, Inc., Fort Lauderdale, FL (US)

(72) Inventor: Jose Reyes, Deerfield Beach, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 399 days.

(21) Appl. No.: 15/444,999

(22) Filed: Feb. 28, 2017

(65) Prior Publication Data

US 2018/0246505 A1    Aug. 30, 2018

(51) Int. Cl.
*G06F 16/00* (2019.01)
*G05B 19/00* (2006.01)
(Continued)

(52) U.S. Cl.
CPC ....... *G06F 16/2315* (2019.01); *G05B 19/042* (2013.01); *G05B 19/4183* (2013.01);
(Continued)

(58) Field of Classification Search
None
See application file for complete search history.

(56) References Cited

U.S. PATENT DOCUMENTS 5,963,911 A * 10/1999 Walker ............... G06Q 10/0631
705/7.12
6,578,005 B1 * 6/2003 Lesaint ................. G06Q 10/06
705/7.14
(Continued)

OTHER PUBLICATIONS

Mu, S., Cui, Y., Zhang, Y., Lloyd, W., & Li, J. (2014). Extracting more concurrency from distributed transactions. In 11th {USESNIX} Symposium on Operating Systems Design and Implementation ({OSDI} 14) (pp. 479-494). https://www.usenix.org/system/files/conference/osdi14/osdi14-paper-mu.pdf (Year: 2014).*
(Continued)

*Primary Examiner* — Rutao Wu
*Assistant Examiner* — Matheus Ribeiro Stivaletti
(74) *Attorney, Agent, or Firm* — BainwoodHuang

(57) ABSTRACT

A method performed by a service management device includes (a) receiving from a plurality of worker machines, a plurality of requests, each request from a worker machine indicating a respective work item to be assigned to that worker machine, (b) in response to receiving each request, performing an assignment attempt operation configured to (i) succeed and insert a reference to the worker machine that issued that request in a database entry associated with the respective work item if no other reference to a worker machine has yet been inserted in the database entry and (ii) otherwise report failure, and (c) returning a reply to the worker machine that issued each request indicating whether the assignment attempt operation succeeded, that worker machine configured to (i) process the respective work item in response to a successful reply and (ii) refrain from processing the respective work item in response to a failed reply.

21 Claims, 8 Drawing Sheets

(51) Int. Cl.
*G06F 16/23* (2019.01)
*G05B 19/418* (2006.01)
*G06F 11/30* (2006.01)
*G05B 19/042* (2006.01)

(52) U.S. Cl.
CPC ...... *G06F 11/3006* (2013.01); *G06F 11/3013* (2013.01); *G06F 11/3093* (2013.01)

(56) References Cited

U.S. PATENT DOCUMENTS

| | | | | |
|---|---|---|---|---|
| 7,590,620 | B1* | 9/2009 | Pike | G06F 11/1482 |
| 10,063,644 | B1* | 8/2018 | Pai | H04L 43/16 |
| 2002/0029272 | A1* | 3/2002 | Weller | G06Q 10/06 |
| | | | | 709/226 |
| 2002/0065795 | A1* | 5/2002 | Asherman | G06F 16/972 |
| 2002/0072949 | A1* | 6/2002 | Araki | G06Q 10/06311 |
| | | | | 705/7.13 |
| 2004/0181791 | A1* | 9/2004 | Hayashi | G06F 9/4881 |
| | | | | 718/100 |
| 2005/0055179 | A1* | 3/2005 | Matheson | G06Q 10/06 |
| | | | | 703/1 |
| 2005/0137925 | A1* | 6/2005 | Lakritz | G06Q 10/06312 |
| | | | | 705/7.22 |
| 2005/0154625 | A1* | 7/2005 | Chua | G06Q 10/06 |
| | | | | 700/100 |
| 2008/0066072 | A1* | 3/2008 | Yurekli | G06Q 10/06 |
| | | | | 718/104 |
| 2008/0091289 | A1* | 4/2008 | Gozzi | G06Q 10/06313 |
| | | | | 700/100 |
| 2010/0057628 | A1* | 3/2010 | Trinidad | G06Q 10/103 |
| | | | | 705/301 |
| 2013/0031480 | A1* | 1/2013 | Boss | G06Q 10/10 |
| | | | | 715/738 |
| 2014/0025770 | A1* | 1/2014 | Warfield | G06F 16/256 |
| | | | | 709/213 |
| 2014/0317681 | A1* | 10/2014 | Shende | H04L 63/10 |
| | | | | 726/1 |
| 2014/0350997 | A1 | 11/2014 | Holm et al. | |
| 2015/0254596 | A1* | 9/2015 | Nayar | G06Q 10/063112 |
| | | | | 705/7.14 |
| 2015/0281114 | A1* | 10/2015 | Wong | H04L 67/34 |
| | | | | 707/748 |
| 2016/0085772 | A1* | 3/2016 | Vermeulen | G06F 16/21 |
| | | | | 707/615 |
| 2017/0006135 | A1* | 1/2017 | Siebel | G06F 9/5072 |
| 2017/0019777 | A1* | 1/2017 | Cole, Jr. | H04W 4/029 |
| 2017/0031743 | A1* | 2/2017 | Borah | G06F 11/3452 |
| 2018/0041595 | A1* | 2/2018 | Dintenfass | H04L 67/22 |

OTHER PUBLICATIONS

Reyes, et al., "Increasing Capacity in a Topic-Subscription Messaging System," U.S. Appl. No. 15/454,486, filed Mar. 9, 2017.
Wikipedia, "Webhook," Feb. 6, 2017, <https://en.wikipedia.org/w/index.php?title=Webhook&oldid=763928032>.
Wikipedia, "Optimistic concurrency control," Aug. 17, 2016, <https://en.wikipedia.org/w/index.php?title=Optimistic_concurrency_control&oldid=734912882>.

* cited by examiner

Fig. 4

38
Persistent Assignment OCC DB

| 82 Work Item ID | 83 Associated Client | 84 Description | 85 Action | 86(1) Worker Assignment Slot 1 | 86(2) Worker Assignment Slot 2 |
|---|---|---|---|---|---|
| 1 | 34(a) | New Admin | Webhook http://cl1.com/?wh=na/ | 40(1) | 40(P) |
| 2 | 34(a) | DDoS Attack | Webhook http://cl1.com/?wh=da/ | 40(1) | 40(2) |
| 3 | 34(b) | New Admin | Webhook http://cl2.com/?wh=na/ | 40(2) | |
| 4 | 34(M) | New Admin | Webhook http://cl3.com/?wh=na/ | | |

90-1, 90-2, 90-3, 90-4

ASSIGNING MONITORING RESPONSIBILITIES IN DISTRIBUTED SYSTEMS USING OPTIMISTIC CONCURRENCY

BACKGROUND

Computerized systems are useful tools for many applications. For example, a cloud-based system may serve thousands of clients using a cloud of several hundred interconnected computers, each running several virtual machines. In some situations, it may be desirable to track various events as they occur throughout the computerized system. Thus, an event tracking machine may be employed to repeatedly check for each tracked event and to raise an alarm or take some other action in response to detecting an event.

SUMMARY

One embodiment is directed to a method performed by a service management device. The method includes (a) receiving from a plurality of worker machines, a plurality of requests, each request from a worker machine indicating a respective work item to be assigned to that worker machine, (b) in response to receiving each request, performing an assignment attempt operation, the assignment attempt operation configured to (i) succeed and insert a reference to the worker machine that issued that request in a database entry associated with the respective work item if no other reference to a worker machine has yet been inserted in the database entry and (ii) otherwise report failure on the assignment attempt operation, and (c) returning, by the service management device, a reply to the worker machine that issued each request, the reply indicating whether the assignment attempt operation succeeded, that worker machine configured to (i) process the respective work item in response to a reply indicating success and (ii) refrain from processing the respective work item in response to a reply indicating lack of success. Other embodiments are directed to a computerized apparatus, system, and computer program products for performing methods similar to that described above.

BRIEF DESCRIPTION OF THE DRAWINGS

The foregoing and other objects, features and advantages will be apparent from the following description of particular embodiments as illustrated in the accompanying drawings in which like reference characters refer to the same parts throughout the different views. The drawings are not necessarily to scale, emphasis instead being placed upon illustrating the principles of various embodiments.

FIG. 4 depicts an example database for use in performing various embodiments.

DETAILED DESCRIPTION

The above-described conventional systems may suffer from deficiencies as the computerized systems expand. For example, a system may include a cloud of 50,000 computers serving 1 million clients, each of which has five events. The event tracking machine would then need to repeatedly check for 5 million events, which may exceed the computational resources (e.g., memory) of the event tracking machine. It may also cause too high of a delay in checking all events. For example, if it takes the event tracking machine 1 millisecond, on average, to check each event, it will take approximately 1.4 hours to cycle through all the events, which may be too high of a latency for many applications. It is possible to scale up and use a more powerful event tracking machine, but eventually a limit on the power and memory of a single machine may be exceeded. Alternatively, it is possible to scale out and operate several event tracking machines in parallel, each event tracking machine being responsible for tracking a subset of the events. However, management of the assignment of events to particular event tracking machines may utilize a large amount of resources, causing inefficiency in the system. For example, several additional computers may be required for the management of twenty event tracking machines.

Thus, it would be desirable to efficiently manage assignments of events to track by each event tracking machine even when dealing with large numbers of events and large numbers of event tracking machines. This may be accomplished by using an optimistic concurrency database to allow each event tracking machine to try to claim as many events to track as it can in competition with the other event tracking machines. Even if redundancy is needed, it is possible, using these techniques, to have two or more event tracking machines claim concurrent responsibility for each tracked event in a responsible and efficient manner.

Figure 1:
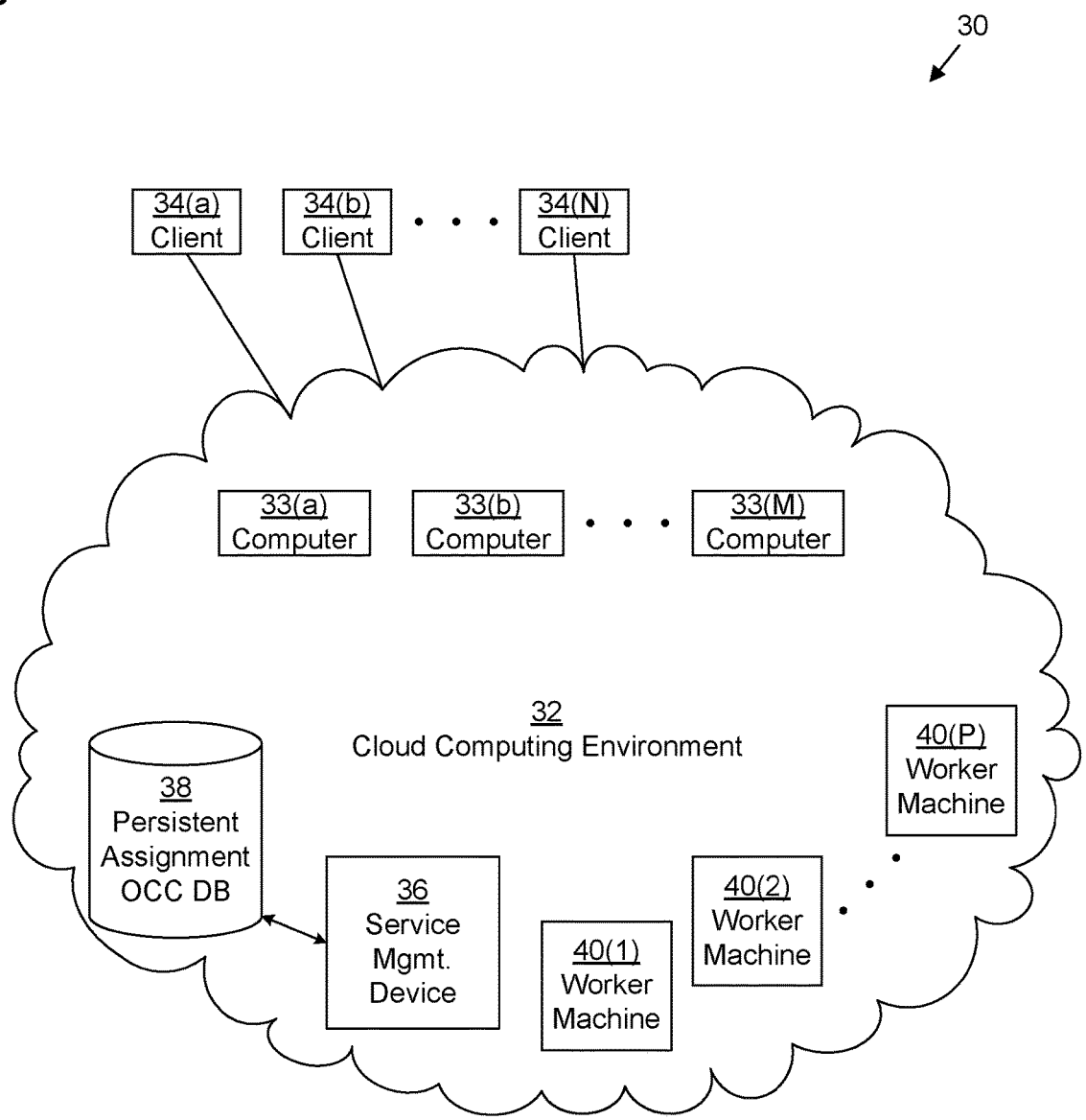
FIG. 1 depicts an example system for use in performing various embodiments.

FIG. 1 depicts an example system 30. System 30 includes a cloud computing environment 32. Cloud computing environment 32 is made up a plurality of computers 33 (depicted as computers 33(a), 33(b), . . . , 33(M)) interconnected across a computer network (not depicted), such as the Internet. The computers 33 of cloud computing environment 32 together provide services to a set of clients 34 (depicted as clients 34(a), 34(b), . . . , 34(N)). Each client 34 may have one or more potential events associated therewith. A potential event is a set of one or more conditions, which, if true, trigger a response. For example, a potential event might be the addition of a new administrator account to a first client 34(a) within the cloud environment 32, which would trigger a notification to a contact associated with that client 34(a). Another potential event might be the detection of a distributed denial of service (DDoS) attack on another client 34(b), which might trigger a notification to a contact associated with that client 34(b) and/or initiation of counter-attack measures.

A list of all potential events that are to be monitored for may be persistently stored within database (DB) 38. DB 38 may be an optimistic concurrency control (OCC) DB, as will be explained below in connection with FIG. 4.

Service management device 36, which may be a part of cloud computing environment 32 (as depicted) or separate but connecting to cloud computing environment 32, stores the list of all potential events that are to be monitored within persistent assignment OCC DB 38 and communicates with a set of worker machines 40 (depicted as worker machines 40(1), 40(2), . . . 40(P)) to coordinate assignments of particular potential events to particular worker machines 40 for monitoring.

Worker machines 40 compete to be assigned to monitor the various potential events within persistent assignment OCC DB 38. Once assigned, each worker machine 40 monitors for the potential events that were assigned to it.

In some embodiments, service management device 36 may be a physical computer. In other embodiments, service management device 36 may operate as a virtual machine (VM) within a hypervisor of a physical computer that may also operate other VMs. In other embodiments, the functions of service management device 36 may be distributed across several physical computers either directly or as VMs.

In some embodiments, each worker machine 40 may be a physical computer. In other embodiments, each worker machine 40 may operate as a VM within a hypervisor of a physical computer that may also operate other VMs. In some embodiments, some worker machines 40 may be physical computers, while other worker machines 40 operate as VMs.

In some embodiments (not depicted), instead of operating in the context of a cloud computing environment 32, service management device 36 (communicating with persistent assignment OCC DB 38) and worker machines 40 may communicate with computers of clients 34 across a network (e.g., the Internet).

Figure 2:
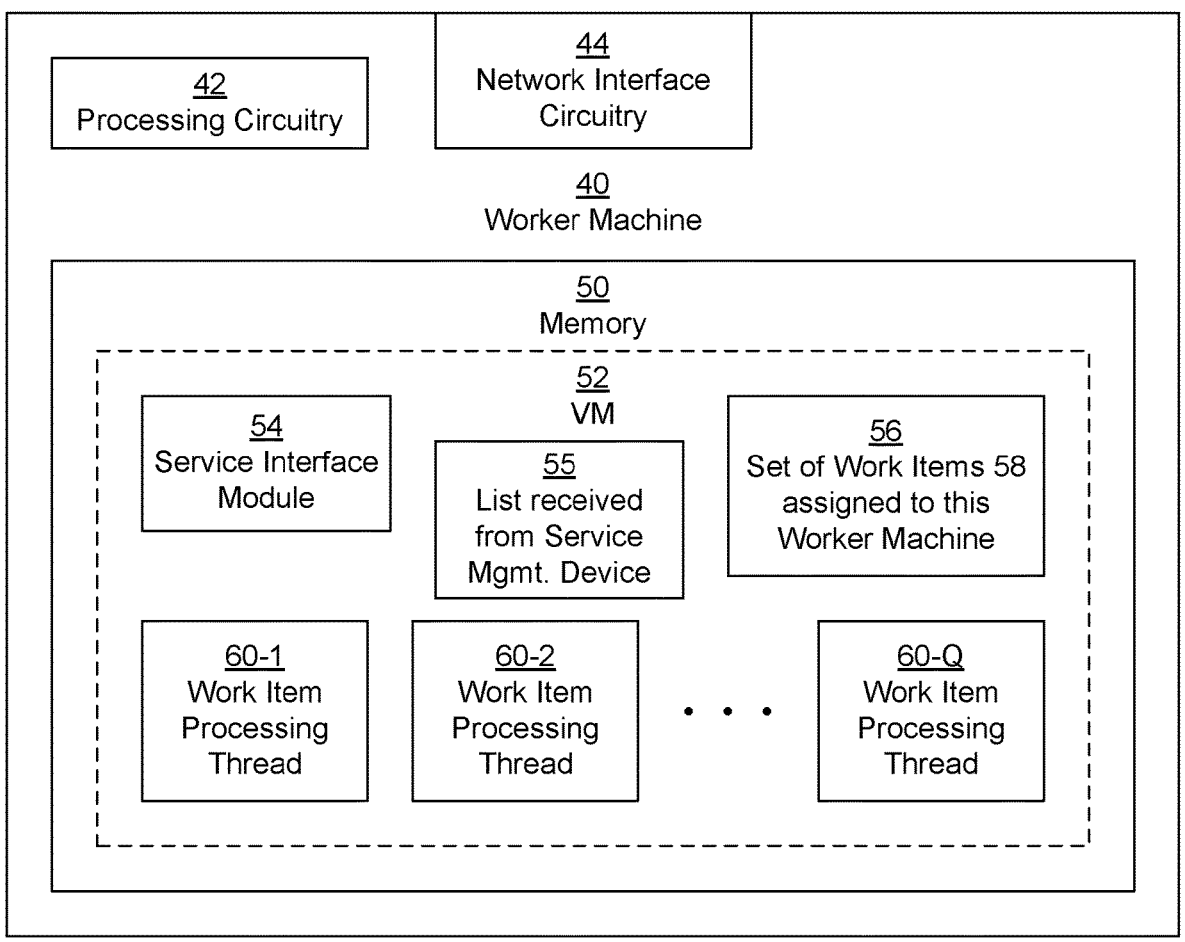
FIG. 2 depicts an example apparatus for use in performing various embodiments.

FIG. 2 depicts an example worker machine 40. Worker machine 40 includes processing circuitry 42, network interface circuitry 44, and memory 50.

Processing circuitry 42 may include any kind of processor or set of processors able to perform operations, such as, for example, a microprocessor, a multi-core microprocessor, a digital signal processor, a collection of electronic circuits, or any combination of the above.

Network interface circuitry 44 interfaces with one or more computer networks. Network interface circuitry 44 may include an Ethernet adapter, a cellular modem, a Wireless Fidelity (WiFi) wireless networking adapter, a Bluetooth adapter, a Near Field Communication adapter, any other device for connecting to a network, or some combination thereof. Worker machine 40 communicates with service management device 36 as well as computers 33 of cloud computing environment 33 via network interface circuitry 44.

Memory 50 may be any kind of digital system memory, such as, for example, RAM. Memory 50 stores programs and applications executing on processing circuitry 42 as well as data used by those programs. Memory 50 may store an operating system (e.g., Unix, Windows, MacOS, Android, IOS, etc.) (not depicted) as well as various other software modules (some of which may be independent applications, while others are parts of other applications or the operating system). In some embodiments, memory 50 may also or instead operate a hypervisor (not depicted), which allows one or more VMs 52 to operate on worker machine 40.

Memory 50 stores various software modules and constructs that run on processing circuitry 42 to effectuate functions of the worker machine 40. These software modules and constructs include a service interface module 54, a set 56 of work items 58 assigned to the worker machine 40, and one or more work item processing threads 60 (depicted as work item processing threads 60-1, 60-2, . . . , 60-Q). In some embodiments, these software modules and constructs 54, 55, 56, 58, 60 are stored and operate within the context of a VM 52. In these embodiments, the VM 52 effectively serves as the worker machine 40 with respect to the system 30 of FIG. 1. In other embodiments, these software modules and constructs 54, 55, 56, 58, 60 are stored in memory 50 and operate directly within the context of an operating system without any VM 52.

Service interface module 54 communicates with service management device 36 in order to request assignment of particular work items 58 for the worker machine 40 to monitor. A work item 58 is a construct made up of a potential event to monitor as well as an associated action definition to take in response to detecting the actual existence of the potential event. Once service interface module 54 has interacted with service management device 36 to store assigned work items 58 within set 56, one or more work item processing threads 60 may operate to go through the list 58 and monitor the work items 58 thereon for existence of their associated potential events within cloud computing environment 32 (or, in other embodiments, within computers of clients 34).

Memory 50 may include both a system memory portion for storing programs and data in active use by the processing circuitry 42 as well as a persistent storage portion (e.g., solid-state storage and/or disk-based storage) for storing programs and data even while the worker machine 40 is powered off. The operating system and the software modules (e.g., 54, 60) are typically stored both in system memory and in persistent storage so that they may be loaded into system memory from persistent storage upon a system restart. Software modules 54, 60 when stored in non-transient form either in system memory or in persistent storage, form a computer program product. The processing circuitry 42 running one or more of these software modules 54, 60 thus forms a specialized circuit constructed and arranged to carry out the various processes described herein.

Figure 3:
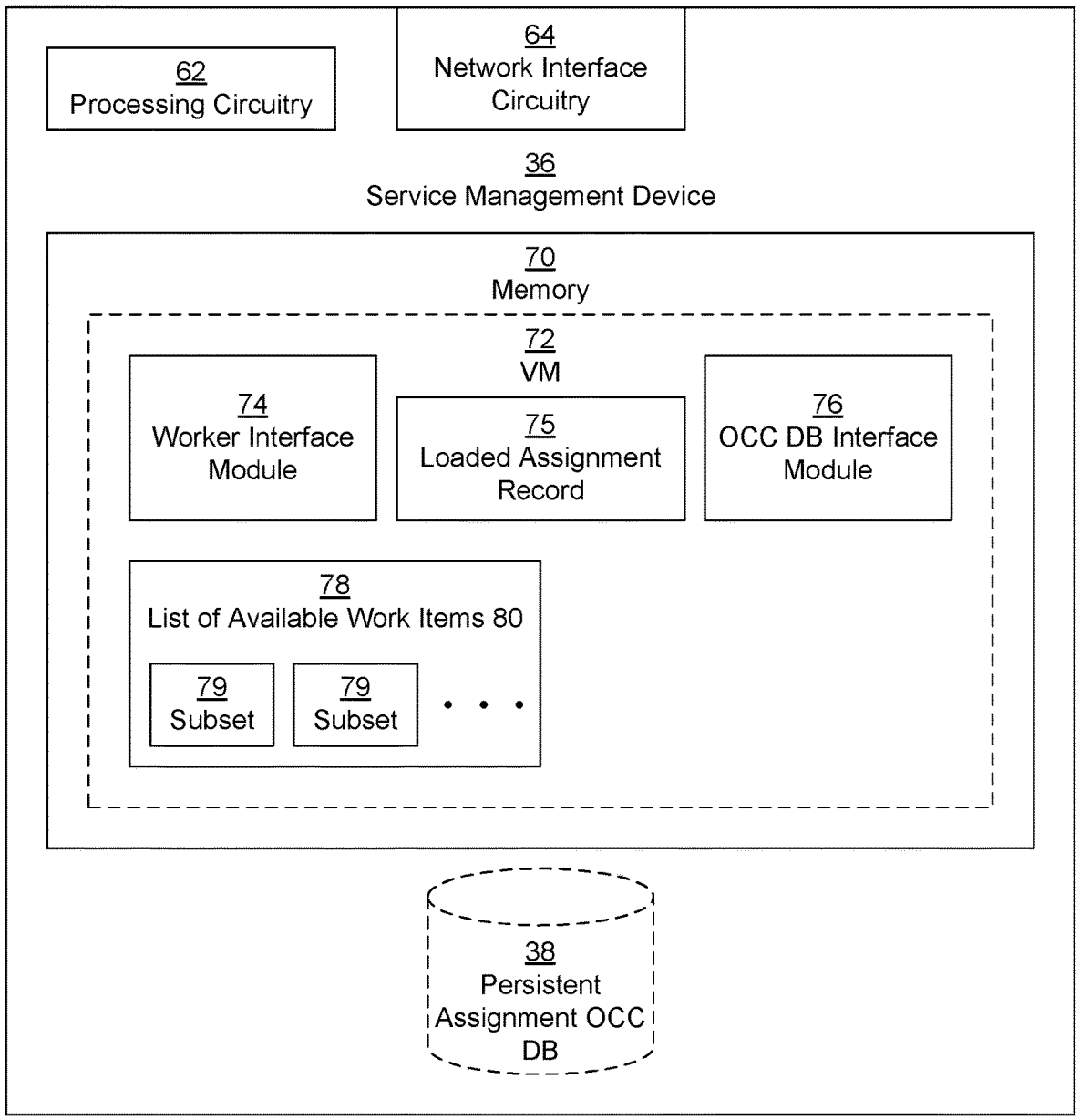
FIG. 3 depicts an example apparatus for use in performing various embodiments.

FIG. 3 depicts an example service management device 36. Service management device 36 includes processing circuitry 642, network interface circuitry 64, and memory 70. In some embodiments, service management device 36 also locally includes the persistent assignment OCC DB 38 with persistent storage (e.g., flash-based or magnetic or optical disk storage, not depicted).

Processing circuitry 62 may include any kind of processor or set of processors able to perform operations, such as, for example, a microprocessor, a multi-core microprocessor, a digital signal processor, a collection of electronic circuits, or any combination of the above.

Network interface circuitry 64 interfaces with one or more computer networks. Network interface circuitry 64 may include an Ethernet adapter, a cellular modem, a Wireless Fidelity (WiFi) wireless networking adapter, a Bluetooth adapter, a Near Field Communication adapter, any other device for connecting to a network, or some combination thereof. Service management device 36 communicates with worker machine 40 as well as computers 33 of cloud computing environment 33 via network interface circuitry 44. In some embodiments, service management device 36 also communicates with persistent assignment OCC DB 38 (residing on a remote computer, not depicted) remotely via network interface circuitry 64.

Memory 70 may be any kind of digital system memory, such as, for example, RAM. Memory 70 stores programs and applications executing on processing circuitry 42 as well as data used by those programs. Memory 70 may store an operating system (e.g., Unix, Windows, MacOS, Android, IOS, etc.) (not depicted) as well as various other software modules (some of which may be independent applications, while others are parts of other applications or the operating system). In some embodiments, memory 70 may also or instead operate a hypervisor (not depicted), which allows one or more VMs 72 to operate on service management device 36.

Memory 70 stores various software modules and constructs that run on processing circuitry 72 to effectuate functions of the service management device 36. These software modules and constructs include a worker interface module 74, one or more loaded assignments records 75, an OCC DB interface module 76, and a list 78 of available work items 80 (which may be divided into one or more subset 79). In some embodiments, these software modules and constructs 74, 75, 76, 78, 79, 80 are stored and operate within the context of a VM 72. In these embodiments, the VM 72 effectively serves as the service management device 36 with respect to the system 30 of FIG. 1. In other embodiments, these software modules and constructs 74, 75, 76, 78, 79, 80 are stored in memory 70 and operate directly within the context of an operating system without any VM 72.

Worker interface module 74 communicates with worker machines 40 in order to complete assignment of particular work items 80 to each worker machine 40 for that worker machine 40 to monitor.

OCC DB interface module 67 communicates with persistent assignment OCC DB 38 in order to generate list 78 of available work items 80 that have not yet been assigned to any worker machine 40. Worker interface module 74 may then communicate with individual worker machines 40 to inform them of a subset 79 of the list 78 of available work items 80. In some embodiments, there is only one subset 79, which includes all available work items 80 of the list 78. In other embodiments, list 78 may be divided into several non-overlapping subsets 79, which are all strict subsets of list 78. In response to sending a subset 79 to a particular worker machine 40(x), worker interface module 74 receives a request to assign a particular work item 80(y) (drawn from the subset 79 sent to that worker machine 40(x)) to that worker machine 40(x). Worker interface module 74 communicates with OCC DB interface module 67 to load an assignment record 75 from persistent assignment OCC DB 38 that is associated with the requested work item 80(y). Further detail with respect to the persistent assignment OCC DB 38 and its records is provided below in connection with FIG. 4. Worker interface module 74 then attempts to insert an assignment to that worker machine 40(x) within the loaded assignment record 75, if possible (i.e., unless another worker machine 40 has already been assigned within loaded assignment record 75, or in some embodiments, more than a maximum number of worker machines 40 have already been assigned within loaded assignment record 75). If worker interface module 74 successfully inserted an assignment to that worker machine 40(x) within the loaded assignment record 75, then OCC DB interface module 76 attempts to write the loaded assignment record 75 back to the persistent assignment OCC DB 38. However, since persistent assignment OCC DB 38 uses OCC, this attempt will fail if the corresponding record within persistent assignment OCC DB 38 has been altered since it was first loaded into memory 70 as loaded assignment record 75, as is well known in the art. Failure may result from another instance of service management device 36 or another thread of service management device 36 assigning the requested work item 80(y) to another worker machine 40 in the interim. Worker interface module 74 is then able to report success or failure to the requesting worker machine 40(x).

Memory 70 may include both a system memory portion for storing programs and data in active use by the processing circuitry 72 as well as a persistent storage portion (e.g., solid-state storage and/or disk-based storage) for storing programs and data even while the service management device 36 is powered off. The operating system and the software modules (e.g., 74, 76) are typically stored both in system memory and in persistent storage so that they may be loaded into system memory from persistent storage upon a system restart. Software modules 74, 76 when stored in non-transient form either in system memory or in persistent storage, form a computer program product. The processing circuitry 72 running one or more of these software modules 74, 76 thus forms a specialized circuit constructed and arranged to carry out the various processes described herein.

FIG. 4 depicts an example persistent assignment OCC DB 38. Persistent assignment OCC DB 38 includes a set of work item records 90 (depicted as work item records 90-1, 90-2, 90-3, 90-4, . . . ). Each work item record 90 includes entries in different columns 82, 83, 84, 85, 86(1), 86(2). Some columns 83, 86(2) may be considered optional. One or both of these columns 83, 86(2) may be omitted in various embodiments.

Entries in the work item identification column 82 include an identification number of the respective work item of that work item record 90.

Entries in the associated client column 83 include an identification number of a particular client 34 with which the respective work item of that work item record 90 is associated. This column 83 may be omitted in various embodiments (e.g., if potential events are not associated with particular clients 34 in system 30).

Entries in the description column 84 include a description of the potential event of the respective work item of that work item record 90 that is to be tracked. This description may be stated in a form that is easily parsed an interpreted by the work item processing threads 60 (e.g., written in a computer-readable programmatic format such as XML).

Entries in the action column 85 include a description of an action to be taken in response to detection of the potential event of the respective work item of that work item record 90 that is to be tracked. This description may be stated in a form that is easily parsed an interpreted by the work item processing threads 60 (e.g., written in a computer-readable programmatic format such as XML).

Entries in the worker assignment slot columns 86 each include an identification number of a worker machine 40 that is assigned to process the respective work item of that work item record 90. In some embodiments, only a single worker assignment slot column 86(1) is used. In other embodiments, two or more worker assignment slot columns 86(1), 86(2), etc. may be used to allow for redundancy in case one worker machine 40 crashes or experiences high latency.

As depicted, work item record 90-1 identifies a work item having a work item identification number of 1 (column 82). This work item is associated with client 34(a) as indicated by the entry in column 83. The potential event described in column 84 is the addition of a new administrator (to the account of client 34(a)). The responsive action to be taken described in column 85 is to access a webhook having a URL as depicted directed to a website of client 34(a) (cl1.com) with a query string of "?wh=na" indicating a webhook associated with the addition of a new administrator. The worker machines 40 assigned to process this work item are worker machine 40(1) in the primary slot of column 86(1) and worker machine 40(P) in the secondary slot of column 86(2).

As depicted, work item record 90-2 identifies a work item having a work item identification number of 2 (column 82).

This work item is associated with client 34(a) as indicated by the entry in column 83. The potential event described in column 84 is the detection of a distributed denial of service (DDoS) attack (directed at the account of client 34(a)). The responsive action to be taken described in column 85 is to access a webhook having a URL as depicted directed to a web site of client 34(a) (cl1.com) with a query string of "?wh=da" indicating a webhook associated with a DDoS attack. The worker machines 40 assigned to process this work item are worker machine 40(1) in the primary slot of column 86(1) and worker machine 40(2) in the secondary slot of column 86(2).

As depicted, work item record 90-3 identifies a work item having a work item identification number of 3 (column 82). This work item is associated with client 34(b) as indicated by the entry in column 83. The potential event described in column 84 is the addition of a new administrator (to the account of client 34(b)). The responsive action to be taken described in column 85 is to access a webhook having a URL as depicted directed to a website of client 34(b) (cl2.com) with a query string of "?wh=na" indicating a webhook associated with the addition of a new administrator. Worker machine 40(1) is assigned to process this work item in the primary slot of column 86(1), but the secondary slot of column 86(2) has not yet been assigned.

As depicted, work item record 90-4 identifies a work item having a work item identification number of 4 (column 82). This work item is associated with client 34(M) as indicated by the entry in column 83. The potential event described in column 84 is the addition of a new administrator (to the account of client 34(M)). The responsive action to be taken described in column 85 is to access a webhook having a URL as depicted directed to a website of client 34(M) (cl3.com) with a query string of "?wh=na" indicating a webhook associated with the addition of a new administrator. No worker machines 40 have yet been is assigned to process this work item in columns 86(1), 86(2).

Although persistent assignment OCC DB 38 is depicted as a table in FIG. 4, in some embodiments, it may have another configuration, such as, for example, that of a relational database.

Figure 5:
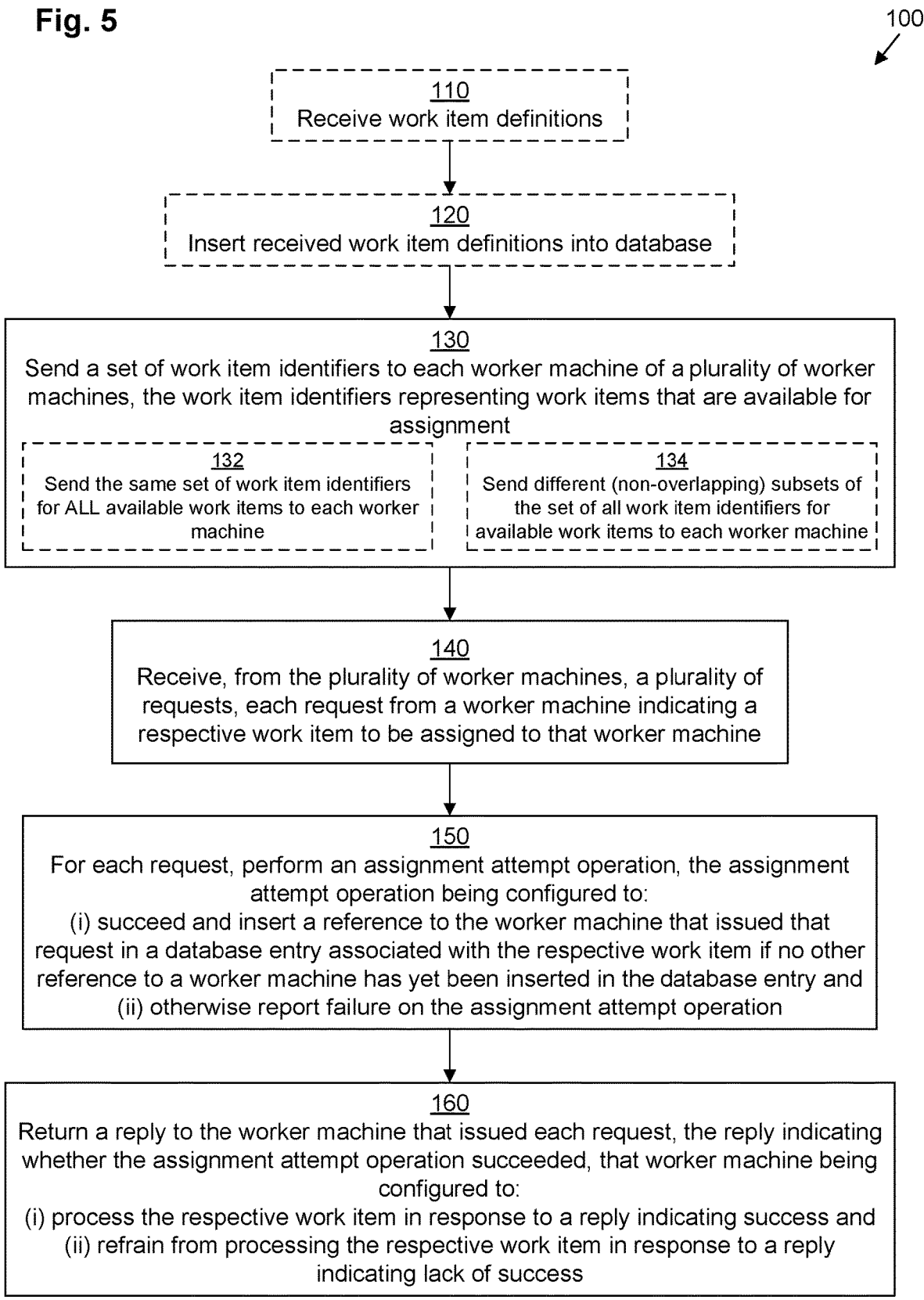
FIG. 5 depicts an example method according to various embodiments.

FIG. 5 depicts an example method 100 performed by a service management device 36. It should be understood that any time a piece of software, such as, for example, service interface module 54, work item processing threads 60, worker interface module 74, OCC DB interface module 76, etc. is described as performing a method, process, step, or function, in actuality what is meant is that a computing device (e.g., service management device 36, worker machine 40) on which that piece of software is running performs the method, process, step, or function when executing that piece of software on its processing circuitry (e.g., processing circuitry 42, 62). It should also be understood that, in some embodiments, instead of processing circuitry 42, 62 executing code of service interface module 54, work item processing threads 60, worker interface module 74, OCC DB interface module 76, etc., specialized circuitry of the service management device 36 or worker machine 40 operates to perform the method, process, step, or function directly in hardware.

It should be understood that, within FIG. 5, steps 110 and 120 are dashed because they may be considered optional and not fundamental to method 100. However, it should be understood that, in some embodiments, one or more of the other steps or sub-steps may also be omitted. Similarly, in some embodiments, one or more steps or sub-steps may be combined together or performed in a different order. In addition, sub-steps 132 and 134 are dashed because they represent alternative embodiments.

In step 110, service management device 36 receives work item definitions. In some embodiments, service management device 36 by a system administrator inputting the work item definitions using a user interface (not depicted) of the service management device 36 or a user interface (not depicted) of a computing device (not depicted) of a client 34. In other embodiments, the work item definitions may be received automatically from each client 34.

In response, in step 120, OCC DB interface module 76 running on service management device 36 inserts the received work item definitions in persistent assignment OCC DB 38 by creating work item records 90 and writing them to the persistent assignment OCC DB 38.

Once the persistent assignment OCC DB 38 has been created or updated, in step 130, service management device 36 sends a set of work item identifiers (i.e., from the entry in column 82 of each record 90 corresponding to an available work item 80 within a subset 79) to each worker machine 40, the work item identifiers representing work items 80 that are available for assignment. In some embodiments, service management device 36 accomplishes step 130 by having OCC DB interface module 76 retrieve the work item identifiers (i.e., from the entry in column 82) of each record 90 having an empty worker assignment slot 86(1), 86(2), and storing the retrieved work item identifiers in list 78.

Then, in sub-step 132, worker interface module 74 sends all the work item identifiers (corresponding to all available work items 80) in list 78 to each worker machine 40. Alternatively, in sub-step 134, worker interface module 74 first divides the list 78 into non-overlapping subsets 79 and then sends a different non-overlapping subset 79 to each respective worker machine 40.

It should be understood that, in some embodiments, step 130 may be performed in response to worker interface module 74 receiving requests for lists of available work items 80 from the various worker machines 40.

In step 140, worker interface module 74 receives assignment requests from the plurality of worker machines 40. Each assignment request from a worker machine indicates a respective work item 80 to be assigned to that worker machine 40 (e.g., by indicating a work item identifier for that work item 80).

Then, in step 150, OCC DB interface module 76 performs an assignment attempt operation. The assignment attempt operation may operate to:

(i) succeed and insert a reference to the worker machine that issued that request in a database entry (column 86(1), 86(2) of persistent assignment ICC DB 38) associated with the respective work item 80 if no other reference to a worker machine 40 has yet been inserted in the database entry (column 86(1), 86(2)) and (ii) otherwise report failure on the assignment attempt operation.

Additional detail with respect to the assignment attempt operation is provided below, in connection with FIG. 6.

In step 160, worker interface module 74 returns a reply to the worker machine 40 that issued each request, the reply indicating whether the assignment attempt operation succeeded for that request. That worker machine may operate to:

(i) process the respective work item in response to a reply indicating success and (ii) refrain from processing the respective work item in response to a reply indicating lack of success.

Figure 6:
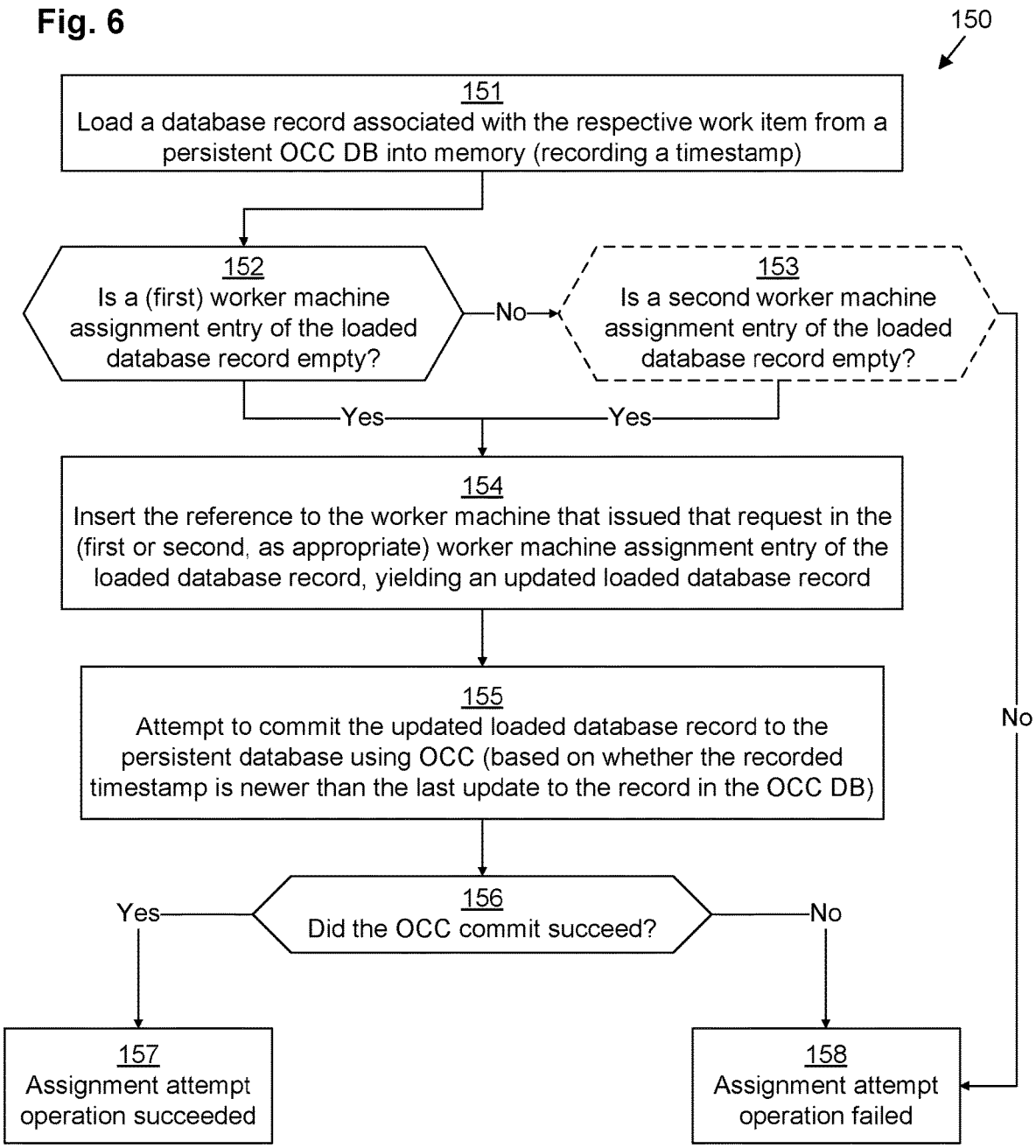
FIG. 6 depicts an example method according to various embodiments.

FIG. 6 depicts an example implementation of step 150 performed by OCC DB interface module 76 running on service management device 36. It should be understood that, within FIG. 6, sub-step 153 is dashed because it may be considered optional and not fundamental to all implementations of step 150. However, it should be understood that, in some embodiments, one or more of the other sub-steps may also be omitted. Similarly, in some embodiments, one or more sub-steps may be combined together or performed in a different order.

In sub-step 151, OCC DB interface module 76 loads a database record 90 associated with the respective work item 80 from persistent OCC DB 38 into memory as loaded assignment record 75. In some embodiments, OCC DB interface module 76 records a timestamp for OCC purposes at this point.

Then, in sub-step 152, OCC DB interface module 76 checks whether the slot1 column 86(1) entry of the loaded record 75 is empty (i.e., no worker machine 40 has yet been assigned to this work item). If not (i.e., if another worker machine 40 has already been assigned to this work item), then, in some embodiments, operation proceeds with sub-step 153. However, in embodiments in which only a single worker assignment slot column 86(1) is used (excluding column 86(2)), operation proceeds directly to sub-step 158.

In sub-step 153, OCC DB interface module 76 checks whether the slot2 column 86(2) entry of the loaded record 75 is empty (i.e., a second worker machine 40 has not yet been assigned to this work item). If not (i.e., if a second worker machine 40 has already been assigned to this work item), then, operation proceeds with sub-step 158.

If, however, either sub-step 152 or sub-step 153 has an affirmative result, then operation proceeds with sub-step 154. In sub-step 154, OCC DB interface module 76 inserts a reference to the worker machine 40 that issued the request in the (first or second, as appropriate) worker machine assignment entry (column 86(1) if sub-step 152 yielded an affirmative result or column 86(2) if sub-step 153 yielded an affirmative result) of the loaded record 75.

Then, in sub-step 155, OCC DB interface module 76 attempts to commit the updated loaded record 75 to the persistent OCC DB 38 using OCC. As is well-known in the art, if the timestamp recorded in sub-step 151 is newer than the last update to the record 90 in persistent OCC DB 38, then the attempt to commit the updated loaded record 75 to the persistent OCC DB 38 using OCC succeeds; otherwise it fails.

Then, in sub-step 156, OCC DB interface module 76 checks whether the attempt to commit in sub-step 155 succeeded. If so, then operation proceeds with sub-step 157, in which step 150 returns success on the assignment attempt operation. Otherwise, operation proceeds with sub-step 158. In sub-step 158, step 150 returns failure on the assignment attempt operation.

Example pseudocode for step 150 follows in Table 1, in which an OCCDB object represents a standard implementation of an optimistic concurrency database as is well-known in the art.

TABLE 1

```
var record = OCCDB.ReadRecord(R)
If record.slot1 == NULL, then:
    record.slot1 = WorkerX
    var error = OCCDB.WriteRecord(R, record)
    if (not error) then return success
    record = OCCDB.ReadRecord(R)
```

TABLE 1-continued

```
    record.slot2 = WorkerX
    error = OCCDB.WriteRecord(R, record)
    if (not error) then return success
    return failure
Else, if record.slot2 == NULL, then:
    record = OCCDB.ReadRecord(R)
    record.slot2 = WorkerX
    var error = OCCDB.WriteRecord(R, record)
    if (not error) then return success
Return failure
```

Figure 7:
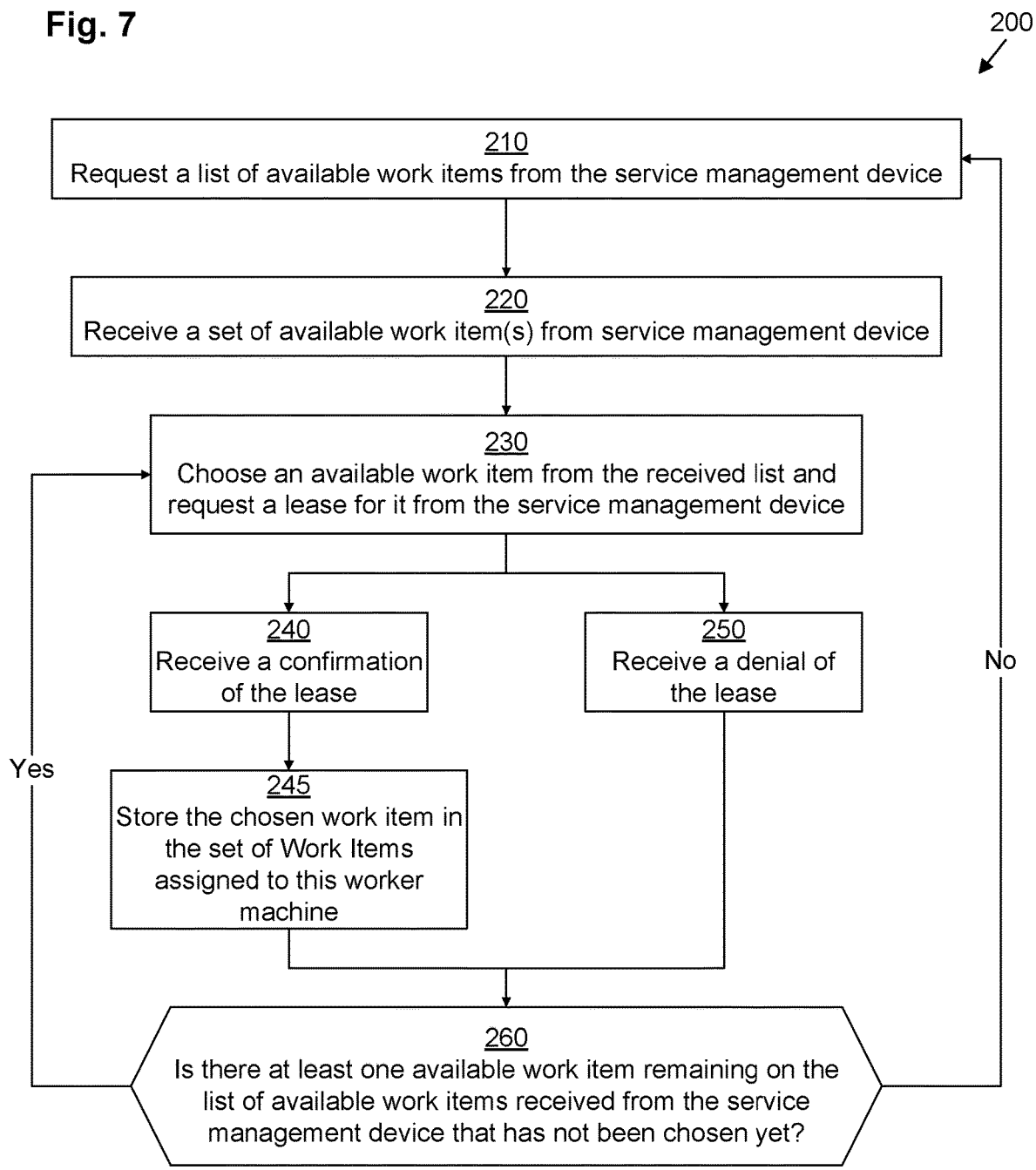
FIG. 7 depicts an example method according to various embodiments.

FIG. 7 depicts an example method 200 performed by service interface module 54 executing on a worker machine 40. It should be understood that, within FIG. 7, in some embodiments, one or more steps may be omitted. Similarly, in some embodiments, one or more steps may be combined together or performed in a different order.

In step 210, service interface module 54 requests a list 55 of available work items 80 from the service management device 36. In step 220, service interface module 54 receives a subset 79 of the list 78 of available work items 80 from service management device 36, storing it locally as list 55.

In step 230, service interface module 54 chooses an available work item 80 from the list 55 and requests an assignment lease for that work item 80 from the service management device 36 (e.g., by sending the work item identification number of that work item 80 to the service management device 36).

In response, after service management device 36 executes method 100, service interface module 54 receives back either a confirmation (step 240) or a denial (step 250) of the assignment lease request. In the event of a confirmation (step 240), operation proceeds with step 245, in which service interface module 54 stores the chosen work item 80 (which it may now receive from the service management device 36) as an assigned work item 58 within set 56.

Regardless, operation proceeds with step 260, in which service interface module 54 checks whether there is at least one available work item 80 remaining on the list 55 received from the service management device 36 that has not been chosen yet. If so, operation returns to step 230, in which the next work item 80 is chosen. Otherwise, operation returns to step 210, in which a new list 55 is requested from the service management device 36, if there are any more available work items 80.

Figure 8:
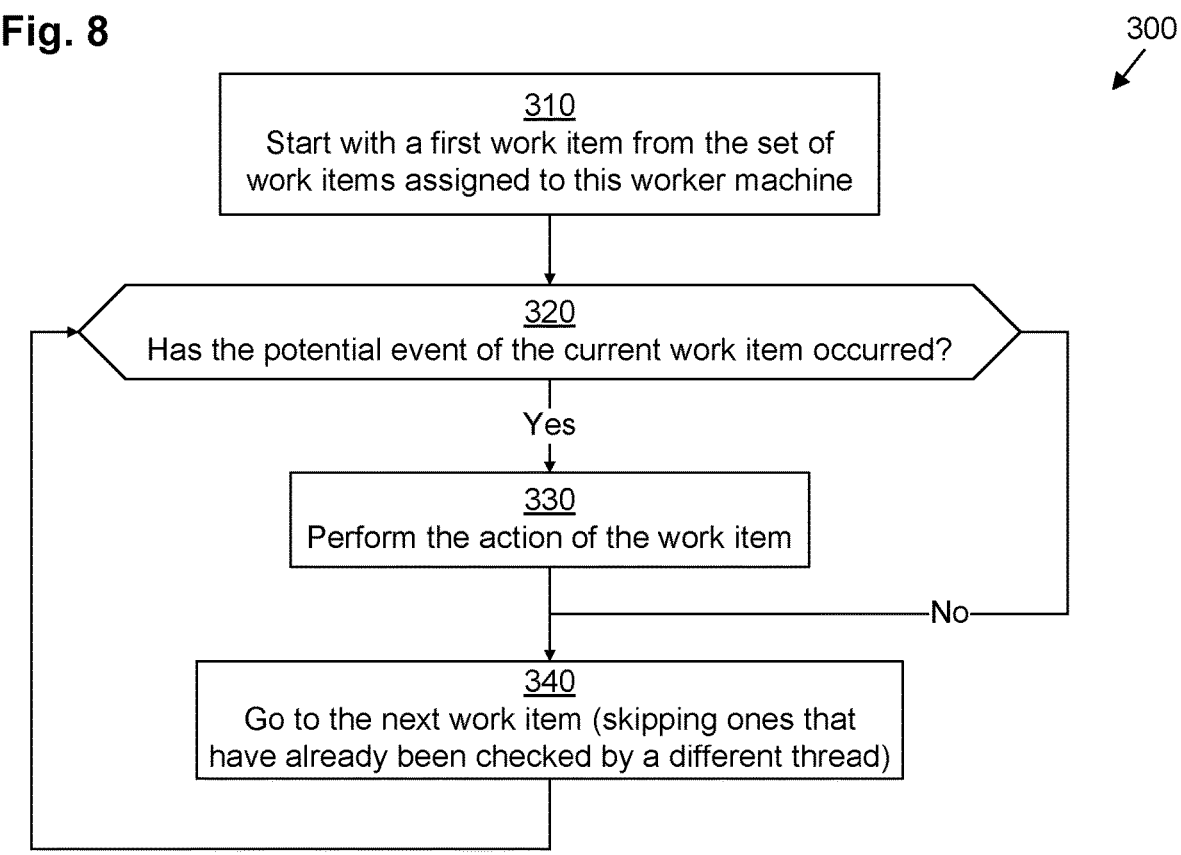
FIG. 8 depicts an example method according to various embodiments.

FIG. 8 depicts an example method 300 performed by work item processing threads 60 executing on a worker machine 40. Method 300 logically follows method 200, although, after method 200 executes at least once, methods 200 and 300 may operate in parallel. It should be understood that, within FIG. 8, in some embodiments, one or more steps may be omitted. Similarly, in some embodiments, one or more steps may be combined together or performed in a different order.

In step 310, a processing thread 60-z begins with a first work item 58 assigned to the current worker machine 40. Then, in step 320, processing thread 60-z checks whether the potential event described within column 84 of the current work item 58 has occurred. Processing thread 60-z may accomplish this by querying a computer 33 within cloud computing environment 32 on which service for the client 34 (see column 83) is running to determine if the potential event has occurred. In some embodiments, upon the potential event occurring, the computer 33 servicing the client 34 flips a flag to indicate that the potential event has occurred. Thus, in these embodiments, processing thread 60-z may simply check the value of the flag to determine if the potential event has occurred. For example, if clients represent homes serviced by an alarm company, and each home has a fire alarm and/or a burglar alarm, whenever either alarm goes off for a given home, a computer 33 servicing that home flips a flag indicating that the respective alarm has gone off. Processing thread 60-z is then able to tell if a particular alarm has been triggered by checking the respective flag for that alarm.

If step 320 yields an affirmative result, then operation proceeds with step 330. Otherwise, operation skips to step 340.

In step 330, processing thread 60-z performs the action (see column 85) defined for the work item whose potential event was determined to have occurred in step 320. Thus, for example, if, in step 320, processing thread 60-z determined that the fire alarm has been triggered for the home of client 34(*b*), then, in step 330 processing thread 60-z may place a 911 call requesting that the fire department report to the home of client 34(*b*) immediately.

In step 340, processing thread 60-z proceeds to move on to the next work item 58 in set 56, and operation returns back to step 320. Since there may be a plurality of processing threads 60 executing in parallel, processing thread 60-z may take precautions to ensure that it does not repeat processing of a work item 58 already processed by another thread 60 (until all work items 58 have been processed, at which point processing repeats for all work items 58 in set 56).

Thus, techniques have been described for efficiently managing assignments of work items 80 to track by each of several worker machines 40 even when dealing with large numbers of work items 80 and large numbers of worker machines 40. This may be accomplished by using an optimistic concurrency database 38 to allow each worker machine 40 to try to claim as many work items 80 to track as it can in competition with the other worker machines 40. Even if redundancy is needed, it is possible, using these techniques, to have two or more worker machines 40 claim concurrent responsibility for each work item 80 in a responsible and efficient manner.

While various embodiments have been particularly shown and described, it will be understood by those skilled in the art that various changes in form and details may be made therein without departing from the spirit and scope of the appended claims.

For example, although various embodiments have been described as being methods, software embodying these methods is also included. Thus, one embodiment includes a tangible non-transient computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Furthermore, it should be understood that all embodiments which have been described may be combined in all possible combinations with each other, except to the extent that such combinations have been explicitly excluded.

Finally, even if a technique, method, apparatus, or other concept is specifically labeled as "conventional," Applicant makes no admission that such technique, method, apparatus, or other concept is actually prior art under 35 U.S.C. § 102 or 35 U.S.C. § 103, such determination being a legal determination that depends upon many factors, not all of which are known to Applicant at this time.

What is claimed is:

1. A method performed by a service management device, the method comprising:
   receiving, from a plurality of worker machines, a plurality of requests, each request from a worker machine indicating a respective work item to be assigned to that worker machine, wherein each work item identifies a respective alarm to be tracked by that worker machine;
   in response to receiving each request, performing an assignment attempt operation to control competition between worker machines, the assignment attempt operation configured to insert a reference to the worker machine that issued that request in a database record corresponding to the respective work item if and only if no more than one other reference to any of the plurality of worker machines has yet been inserted into the database record; and
   returning, by the service management device, a reply to the worker machine that issued each request, the reply indicating whether the assignment attempt operation succeeded, that worker machine configured to:
   (i) process the respective work item in response to a reply indicating success, so as to track for its respective alarm, and
   (ii) refrain from processing the respective work item in response to a reply indicating lack of success.

2. The method of claim 1 wherein tracking for the respective alarm includes monitoring a particular object for an alarm.

3. The method of claim 2 wherein monitoring the particular object for the alarm includes monitoring a client account of a plurality of client accounts hosted on a cloud computing system for an addition of a new administrator of that client account.

4. The method of claim 2 wherein monitoring the particular object for the alarm includes calling a pre-defined webhook in response to detecting a monitored event.

5. The method of claim 2 wherein monitoring the particular object for the alarm includes monitoring a client account of a plurality of client accounts hosted on a cloud computing system for a distributed denial of service attack on that client account.

6. The method of claim 2 wherein:
   monitoring the particular object for the alarm includes monitoring a client account of a plurality of client accounts hosted on a cloud computing system for an addition of a new administrator of that client account;
   the method further comprises sending a set of work item identifiers to the plurality of worker machines, the work item identifiers representing work items that are available for assignment; and
   receiving the plurality of requests is performed in response to sending the set of work items to the plurality of worker machines.

7. The method of claim 1 wherein:
   the method further comprises sending a set of work item identifiers to the plurality of worker machines, the work item identifiers representing work items that are available for assignment; and
   receiving the plurality of requests is performed in response to sending the set of work items to the plurality of worker machines.

8. The method of claim 7 wherein sending the set of work item identifiers to the plurality of worker machines includes sending, to each worker machine, work item identifiers for all work items that are available for assignment.

9. The method of claim 7 wherein sending the set of work item identifiers to the plurality of worker machines includes:
sending, to a first worker machine of the plurality of worker machines, work item identifiers for a first set of work items that are available for assignment, the first set including fewer than all of the work items that are available for assignment; and
sending, to a second worker machine of the plurality of worker machines, work item identifiers for a second set of work items that are available for assignment, the second set including fewer than all of the work items that are available for assignment, the first set being distinct from the second set.

10. The method of claim 1 wherein performing the assignment attempt operation includes:
loading the database record corresponding to the respective work item from a persistent optimistic concurrency control (OCC) database into memory and recording a timestamp indicating when the OCC database record was loaded into memory;
determining whether a worker assignment entry of the loaded database record is empty;
in response to determining that the worker assignment entry of the loaded database record is empty, inserting the reference to the worker machine that issued that request in the worker assignment entry of the loaded database record, yielding an updated loaded database record; and
attempting to commit the updated loaded database record to the persistent OCC database using OCC based on the recorded timestamp.

11. The method of claim 10 wherein performing the assignment attempt operation further includes, in response to a failure of the attempt to commit the updated loaded database record to the persistent OCC database using OCC:
determining whether another worker assignment entry of the loaded database record is empty;
in response to determining that the other worker assignment entry of the loaded database record is empty, inserting the reference to the worker machine that issued that request in the other worker assignment entry of the loaded database record, yielding a newly-updated loaded database record; and
attempting to commit the newly-updated loaded database record to the persistent database using OCC.

12. The method of claim 1 wherein performing the assignment attempt operation includes:
loading the database record corresponding to the respective work item from a persistent optimistic concurrency control (OCC) database into memory and recording a timestamp indicating when the OCC database record was loaded into memory;
determining whether a first worker assignment entry of the loaded database record is empty;
in response to determining that the first worker assignment entry of the loaded database record is not empty, determining whether a second worker assignment entry of the loaded database record is empty;
in response to determining that the second worker assignment entry of the loaded database record is empty, inserting the reference to the worker machine that issued that request in the second worker assignment entry of the loaded database record, yielding an updated loaded database record; and attempting to commit the updated loaded database record to the persistent OCC database using OCC based on the recorded timestamp.

13. The method of claim 1 wherein receiving the plurality of requests from the plurality of worker machines includes receiving, as part of each request from each worker machine, a work item identifier that identifies a particular work item that is requested to be assigned to that worker machine.

14. A computer program product comprising a non-transitory computer-readable storage medium storing a set of instructions, which, when executed by a computing device, cause the computing device to:
receive, from a plurality of worker machines, a plurality of requests, each request from a worker machine indicating a respective work item to be assigned to that worker machine, wherein each work item identifies a respective alarm to be tracked by that worker machine;
in response to receiving each request, perform an assignment attempt operation to control competition between worker machines, the assignment attempt operation configured to insert a reference to the worker machine that issued that request in a database record corresponding to the respective work item if and only if no more than one other reference to any of the plurality of worker machines has yet been inserted into the database record; and
return a reply to the worker machine that issued each request, the reply indicating whether the assignment attempt operation succeeded, that worker machine configured to:
(i) process the respective work item in response to a reply indicating success, so as to track for its respective alarm, and
(ii) refrain from processing the respective work item in response to a reply indicating lack of success.

15. The computer program product of claim 14 wherein performing the assignment attempt operation includes:
loading the database record corresponding to the respective work item from a persistent optimistic concurrency control (OCC) database into memory and recording a timestamp indicating when the OCC database record was loaded into memory;
determining whether a worker assignment entry of the loaded database record is empty;
in response to determining that the worker assignment entry of the loaded database record is empty, inserting the reference to the worker machine that issued that request in the worker assignment entry of the loaded database record, yielding an updated loaded database record; and
attempting to commit the updated loaded database record to the persistent OCC database using OCC based on the recorded timestamp.

16. The computer program product of claim 15 wherein performing the assignment attempt operation further includes, in response to a failure of the attempt to commit the updated loaded database record to the persistent OCC database using OCC:
determining whether another worker assignment entry of the loaded database record is empty;
in response to determining that the other worker assignment entry of the loaded database record is empty, inserting the reference to the worker machine that issued that request in the other worker assignment entry of the loaded database record, yielding a newly-updated loaded database record; and attempting to commit the newly-updated loaded database record to the persistent database using OCC.

17. The computer program product of claim 15 wherein performing the assignment attempt operation further includes:
   in response to determining that the worker assignment entry of the loaded database record is not empty, determining whether another worker assignment entry of the loaded database record is empty; and
   in response to determining that the other worker assignment entry of the loaded database record is empty, inserting the reference to the worker machine that issued that request in the other worker assignment entry of the loaded database record, yielding the updated loaded database record.

18. An apparatus comprising:
   network interface circuitry configured to communicate with a plurality of worker machines;
   memory coupled to processing circuitry configured to:
      receive, from the plurality of worker machines, a plurality of requests, each request from a worker machine indicating a respective work item to be assigned to that worker machine, wherein each work item identifies a respective alarm to be tracked by that worker machine;
      in response to receiving each request, perform an assignment attempt operation to control competition between worker machines, the assignment attempt operation configured to insert a reference to the worker machine that issued that request in a database record corresponding to the respective work item if and only if no more than one other reference to any of the plurality of worker machines has yet been inserted into the database record; and
      return a reply to the worker machine that issued each request, the reply indicating whether the assignment attempt operation succeeded, that worker machine configured to:
         (i) process the respective work item in response to a reply indicating success, so as to track for its respective alarm, and
         (ii) refrain from processing the respective work item in response to a reply indicating lack of success.

19. The apparatus of claim 18 wherein performing the assignment attempt operation includes:
   loading the database record corresponding to the respective work item from a persistent optimistic concurrency control (OCC) database into memory and recording a timestamp indicating when the OCC database record was loaded into memory;
   determining whether a worker assignment entry of the loaded database record is empty;
   in response to determining that the worker assignment entry of the loaded database record is empty, inserting the reference to the worker machine that issued that request in the worker assignment entry of the loaded database record, yielding an updated loaded database record; and
   attempting to commit the updated loaded database record to the persistent OCC database using OCC based on the recorded timestamp.

20. The apparatus of claim 19 wherein performing the assignment attempt operation further includes, in response to a failure of the attempt to commit the updated loaded database record to the persistent OCC database using OCC:
   determining whether another worker assignment entry of the loaded database record is empty;
   in response to determining that the other worker assignment entry of the loaded database record is empty, inserting the reference to the worker machine that issued that request in the other worker assignment entry of the loaded database record, yielding a newly-updated loaded database record; and
   attempting to commit the newly-updated loaded database record to the persistent database using OCC.

21. The apparatus of claim 19 wherein performing the assignment attempt operation further includes:
   in response to determining that the worker assignment entry of the loaded database record is not empty, determining whether another worker assignment entry of the loaded database record is empty; and
   in response to determining that the other worker assignment entry of the loaded database record is empty, inserting the reference to the worker machine that issued that request in the other worker assignment entry of the loaded database record, yielding the updated loaded database record.

* * * * *